United States Patent
Deyaf et al.

(10) Patent No.: US 9,738,213 B1
(45) Date of Patent: Aug. 22, 2017

(54) APPARATUS AND METHOD FOR CONTROLLING A VEHICLE LIGHT WITH ADJUSTABLE LIGHT OUTPUT USING OBD DATA

(71) Applicant: Feniex Industries, Inc., Austin, TX (US)

(72) Inventors: Hamza Deyaf, Austin, TX (US); Nicholas Mazzanti, Austin, TX (US); Kyle Hale, Austin, TX (US)

(73) Assignee: Feniex Industries, Inc., Austin, TX (US)

( * ) Notice: Subject to any disclaimer, the term of this patent is extended or adjusted under 35 U.S.C. 154(b) by 0 days.

(21) Appl. No.: 15/414,055

(22) Filed: Jan. 24, 2017

Related U.S. Application Data

(63) Continuation-in-part of application No. 15/413,657, filed on Jan. 24, 2017, and a continuation-in-part of application No. 15/413,799, filed on Jan. 24, 2017.

(51) Int. Cl.
| | |
|---|---|
| *B60Q 1/14* | (2006.01) |
| *B60Q 1/08* | (2006.01) |
| *B60Q 1/18* | (2006.01) |
| *F21S 8/10* | (2006.01) |
| *B60Q 1/12* | (2006.01) |
| *H05B 37/02* | (2006.01) |
| *H05B 33/08* | (2006.01) |

(52) U.S. Cl.
CPC .............. *B60Q 1/08* (2013.01); *B60Q 1/12* (2013.01); *B60Q 1/18* (2013.01); *F21S 48/1154* (2013.01); *F21S 48/125* (2013.01); *F21S 48/1329* (2013.01); *F21S 48/1721* (2013.01); *F21S 48/1757* (2013.01); *H05B 33/0854* (2013.01); *H05B 37/0272* (2013.01); *B60Q 2300/112* (2013.01); *B60Q 2300/12* (2013.01); *B60Q 2300/21* (2013.01); *B60Q 2900/30* (2013.01)

(58) Field of Classification Search
CPC ............ H05B 37/0272; H05B 33/0854; B60Q 2900/30
USPC .............. 315/77, 149, 308; 307/10.1; 700/83
See application file for complete search history.

(56) References Cited

U.S. PATENT DOCUMENTS

| | | | |
|---|---|---|---|
| 6,940,422 B1 * | 9/2005 | Bachelder | G08G 1/087 340/906 |
| 7,327,280 B2 * | 2/2008 | Bachelder | F41G 9/00 340/902 |
| 9,423,090 B1 | 8/2016 | Deyaf | |
| 9,423,092 B1 | 8/2016 | Deyaf | |

(Continued)

*Primary Examiner* — Thuy Vinh Tran

(57) ABSTRACT

An apparatus for controlling a vehicle light with adjustable light output is provided, whereby the apparatus includes a processor configured to receive on-board diagnostics (OBD) data and to determine a light output mode for the vehicle light in accordance with the OBD data, whereby the OBD data indicates a vehicle condition. The apparatus includes a transceiver coupled to the processor that is configured to signal the light output mode to the vehicle light. A method of controlling a vehicle light is provided that includes receiving OBD data from an OBD system in a vehicle, whereby the OBD data determines a vehicle condition, determining a light output mode of the vehicle light in accordance with the OBD data, and sending to the vehicle light appropriate commands for adjusting the light output in accordance with the determined light output mode.

18 Claims, 3 Drawing Sheets

(56) References Cited

U.S. PATENT DOCUMENTS

2016/0023588 A1* 1/2016 Peterson ............ H05B 37/0272
                                                                    315/77
2016/0366746 A1* 12/2016 van de Ven ............. F21V 29/74

* cited by examiner

APPARATUS AND METHOD FOR CONTROLLING A VEHICLE LIGHT WITH ADJUSTABLE LIGHT OUTPUT USING OBD DATA

CROSS REFERENCE TO RELATED APPLICATIONS

This application is a continuation in part application of U.S. patent application Ser. No. 15/413,657, which was filed on Jan. 24, 2017, and U.S. patent application Ser. No. 15/413,799, which was filed on Jan. 24, 2017.

FIELD OF THE DISCLOSURE

The illustrative embodiments relate generally to one or more embodiments for a controller system for a vehicle light. Further, the illustrative embodiments relate generally to controlling vehicle lights, whereby the light output emitted from a vehicle light may be adjustable to suit the lighting needs of a driver.

BACKGROUND

Many vehicles, including but not limited to, passenger vehicles, utility vehicles, transportation vehicles, off-road vehicles, emergency vehicles, and other vehicles need vehicle lights to provide illumination. Such illumination is a necessity when vehicles are driven at night. Illumination is also needed in conditions where visibility may be poor, including during inclement weather and/or in locations with limited natural and artificial lighting. Drivers may also choose to supplement their vehicles with auxiliary vehicle lights. The added illumination provided by auxiliary vehicle lights may greatly assist to provide increased visibility of a user's surrounding environment. Further benefit can be achieved by adapting the illumination and light output of vehicle lights and auxiliary vehicle lights to various conditions of vehicle movement and surroundings.

SUMMARY

In one aspect, embodiments in the present description are provided that relate to an apparatus for controlling a vehicle light, whereby the vehicle light has an adjustable light output. The apparatus, in one or more embodiments, may include a processor configured to receive on-board diagnostics (OBD) data and to determine a light output mode for the vehicle light in accordance with the OBD data, whereby the OBD data indicates a vehicle condition. The apparatus may further include a transceiver coupled to the processor that is configured to signal the light output mode to the vehicle light.

In another aspect, embodiments provided in the present description may relate to a method of controlling a vehicle light with adjustable light mode. In one or more embodiments, the method may include receiving on-board diagnostics (OBD) data from an OBD system in a vehicle, wherein the OBD data determines a vehicle condition and determining, using a processor, a light output mode in accordance with the OBD data. A method may further include sending to the vehicle light appropriate commands for adjusting the light output in accordance with the determined light output mode.

In yet another aspect, embodiments provided in the present description may relate to an apparatus for controlling a vehicle light with adjustable light output. An apparatus may include a processor configured to receive on-board diagnostics (OBD) data from an OBD system in a vehicle and to determine an angle of light spread for the vehicle light in accordance with the OBD data. An apparatus may further include a transceiver coupled to the processor and configured to signal the determined angle of light spread to the vehicle light.

Other aspects and advantages of the invention will be apparent from the following description and the appended claims.

DETAILED DESCRIPTION

Figure 1:
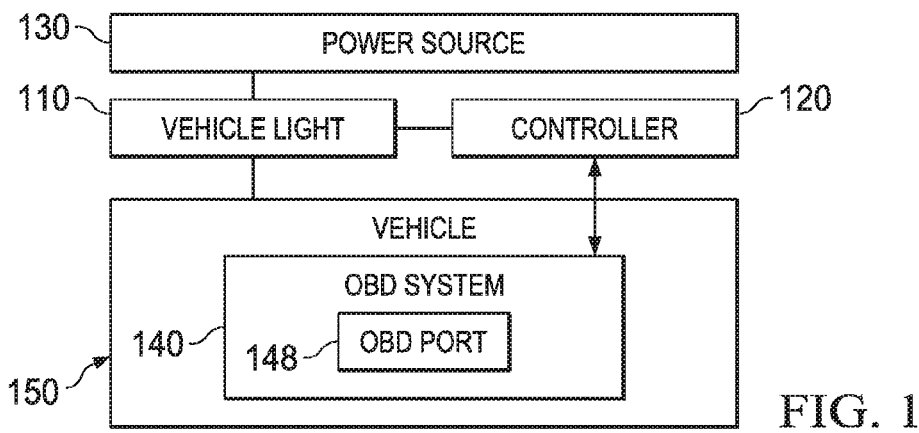
FIG. 1 is a block diagram of components including a vehicle light with a corresponding controller in accordance with an illustrative embodiment.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

Throughout the drawings, like reference characters are used to designate like elements. As used herein, the term "coupled" or "coupling" may indicate a connection. The connection may be a direct or an indirection connection between one or more items. Further, the term "set" as used herein may denote one or more of any item.

In the following discussion and in the claims, the terms "including" and "comprising" are used in an open-ended fashion, and thus should be interpreted to mean "including, but not limited to . . . ."

As a preface to the detailed description, it should be noted that, as used in this specification, the singular forms "a", "an", and "the" included plural referents, unless the context clearly dictates otherwise.

The term vehicle is used herein to indicate any transportation vehicles including road vehicles, off-road vehicles, wheel-based vehicles, special track vehicles, water vehicles, snow vehicles, or other driven vehicles. Drivers of such vehicles use vehicle lights for illuminating surrounding environment. Further, drivers may choose to supplement their vehicles with auxiliary vehicle lights that are attached to one or more surfaces of a vehicle in order to provide additional or enhanced light and illumination for a vehicle. For example, drivers of emergency vehicles, such as police, fire, and emergency medical service (EMS) vehicles, or drivers of off-road vehicles, such as for recreational use or outdoor activities, may supplement their vehicles lights with auxiliary vehicle lights. Enhanced illumination can also become a necessity for many vehicles when driven or operated either at nighttime and/or in conditions with poor visibility, such as during rainstorms, fog, or icy weather.

In general, the term "vehicle light" used herein can be any suitable light fixture comprising a light source and used in a vehicle. The vehicle light can be an integrated part of a vehicle or any type of auxiliary vehicle light attached to or mounted on a vehicle. Examples of vehicle lights include light heads, light bars, dash lights, or any type of mounted lights. The different illustrative embodiments of the present disclosure provide for a controller system for adjusting the light output of vehicle lights, such as the angle of light spread, which could benefit drivers of various vehicles. The controllers are used to adapt one or more vehicle lights to the environment or driving condition of a vehicle. The light output from a vehicle light may be controlled to achieve a particular light output, such as a particular angle of light spread.

It is noted that U.S. Pat. Nos. 9,423,090 and 9,423,092, which are assigned to the present assignee, describe one or more embodiments for a vehicle light whereby the light produced from the light source within the vehicle light may be adjustable over a range of angles so as to have an adjustable spread of light output. U.S. Pat. Nos. 9,423,090 and 9,423,092 are incorporated herein in their entirety.

The one or more embodiments described herein may provide for a vehicle light whose angle of light spread, for example, may be adjusted to produce various sized floodlights or spotlights to suit the preferences or driving needs of a driver. Beneficially, drivers may welcome a vehicle light that provides more than a single type of light output mode, because such a vehicle light may effectively replace multiple vehicle lights that are conventionally used to provide either a spotlight or floodlight, but not both. Further, drivers may welcome a vehicle light that may be controlled either manually via user input selection or autonomously as further discussed in the present disclosure. Other properties of light output may also be adjustable using the vehicle light controller disclosed herein. For instance, controlling the light output can include adjusting a particular shape of light beam, such as a circular or elliptical light beam. An elliptical light beam, for example, may be advantageous to cover a wider area. Adjusting the light output can also include increasing/decreasing the intensity of light output such as for different visibility conditions.

FIG. 1 shows a block diagram of components including a vehicle light 110 with a corresponding controller 120 in accordance with an illustrative embodiment. Vehicle light 110 may be coupled to a surface of a vehicle, such as vehicle 150. Vehicle 150 may be any type of automobile, including an emergency vehicle or an off-road vehicle. Vehicle 150 may be a road driven vehicle or a wheel based vehicle. Other vehicle types can also use this system for controlling the light output, such as, without limitation, water or marine based vehicles, snow gliding vehicles, military vehicles, or industrial vehicles. When vehicle 150 is an off-road vehicle, vehicle 150 may be driven over uneven, unpaved terrain of every kind and in environments with little to no artificial lighting.

Vehicle light 110 can be a light fixture attached to vehicle 150, and may include at least one light source such as a light bulb or a light emitting diode (LED). The auxiliary light fixture may be attached on any suitable area on the surface of the vehicle. For example, the vehicle light 110 can be placed on the top surface of the vehicle or on the front hood. In another embodiment, the vehicle light 110 is an integrated light fixture of the vehicle, such as a headlight or backlight of the vehicle.

The controller 120 for the light source 110 can be located in the vehicle. The controller 120 includes electric or electronic components for controlling and adapting the vehicle light 110 to change the behavior of the light output from the vehicle light 110. For example, changing the behavior of the light output includes changing the angle of light spread of the light beam as projected from the vehicle light 110 outside the vehicle. The controller 120 communicates with the vehicle light 110 via a wired connection (e.g., a cable or wire) or a wireless connection (e.g., through some form of wireless signals with suitable range). Although one light device 110 is shown in FIG. 1, in some embodiments, controller 120 may be coupled to multiple light devices 110. In such embodiments, the multiple light devices 110 can be controlled jointly or independently by controller 120. For instance, controller 120 similarly and jointly may be configured to increase or decrease the angle of light spread of two front headlights on both sides of the vehicle.

A power source 130, such as, without limitation, a vehicle battery, supplies the vehicle light 110 and the controller 120 with power. Examples of vehicle batteries that may serve as a power source, such as power source 130, may include, but not limited to, lead-acid batteries used in fuel vehicles, or lithium-ion batteries used in electric or hybrid vehicles. The vehicle light 110 and the controller 120 can be connected to the power source 130 via wires or electric cables in any suitable arrangement. For example, each of these two components can be supplied power from the power source 130 directly or through other components. In one implementation, either one of the two components can be connected to the power source 130 and in turn supplies some of the power to the other component via a cable.

The system also includes an on-board diagnostics (OBD) system 140, which is embedded in the vehicle 150 and provides vehicle's self-diagnostic and reporting capability The OBD system 140 gives access to the status of various vehicle subsystems. For instance, the OBD system 140 can illuminate a malfunction indicator light (e.g., on the dashboard) if a problem was detected. The OBD system 140 also includes a digital communications port 148, also referred to as an OBD port, which provides real-time data and standardized series of diagnostic trouble codes (DTCs) that are used to monitor vehicle performance or identify malfunctions within the vehicle 150. The OBD system 140 also accesses sensors embedded in the vehicle 150 to provide diagnostic information, for instance as in the case of the OBD-II system, which have been available since the late 1990s in most cars in the U.S. The sensors can include sensors for measuring engine performance, such as vehicle speed or steering wheel position.

The OBD system 140 may be used to provide autonomous control for the vehicle light 110, as described further below. The OBD system 140 can be connected by one or more OBD ports 148 to the controller 120 and provides the controller 120 with data, which can be analyzed by the controller 120 to determine a proper adjustment of the light output for the vehicle light 110. The OBD ports 148 can be located in various positions under the dashboard or under the hood of vehicle 150. For instance, the OBD-II system has a port located in the passenger compartment, which is easily accessible from the driver's seat. The connection between the OBD system 140 and the controller 120 can be a wired connection (e.g., a cable) or a wireless connection (e.g., through some form of wireless signaling). For example, the OBD system 140 can send data to the controller 120 via radio signals. In one embodiment, the OBD system 140 is also connected to the power source 130 via a wire or electric cable in any suitable arrangement.

Figure 2:
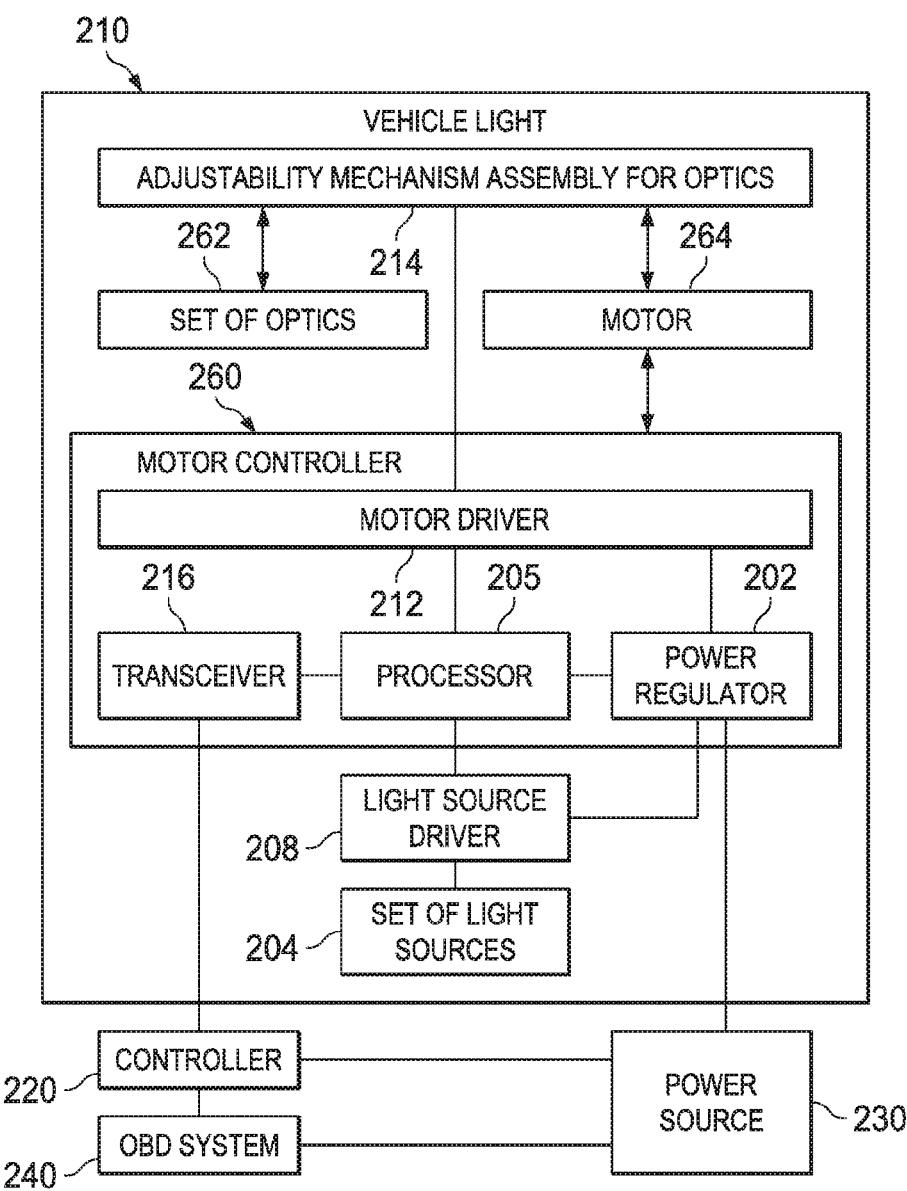
FIG. 2 is a block diagram of components of a vehicle light adjustable by a controller in accordance with an illustrative embodiment.

FIG. 2 shows a block diagram of components of a vehicle light 210 adjustable by a controller 220 in accordance with an illustrative embodiment. Vehicle light 210 and controller 220 may be a vehicle light and a controller in accordance with vehicle light 130 and controller 120 in FIG. 1. Although one vehicle light 210 is shown in FIG. 2, the system can include any number of vehicle lights 210 with similar components. The connection between each vehicle light 210 and the controller 220 can be a wired or a wireless connection. The function of the controller 220 is to adjust the light output behavior, for instance, the angle of light spread, of each connected vehicle light 210. The controller 220 is also connectable to an OBD system 240 via the OBD system port 148. A power source 230 supplies power to the vehicle light 210, the controller 220, and the OBD system 240 via suitable wiring. In one or more embodiments, OBD system 240 may be an OBD system in accordance with OBD system 140 in FIG. 1.

The vehicle light 210 is a fixture or an enclosed apparatus containing one or more light sources, such as, the set of light sources 204. In an embodiment, a set of one or more LEDs is used as set of the light sources 204. Alternatively, any other suitable light source known in the art may be used.

The set of light sources 204 emits a light output in the form of a projected beam of light. The light beam is projected through a set of one or more optics in the vehicle light 210. As used herein, set of optics 264 may include, without limitation, lenses, reflectors, total internal reflecting (TIR) optics having embedded lenses, or any combination thereof. As used herein, the term optics refers to any component used to direct or manipulate a light beam along a light trajectory from the set of light sources 204. For instance, the set of optics, as used herein, may refer to the assembly of lenses, reflectors such as mirrors with any shaped surface, TIR components, optic light filter such as thin films, or any combination thereof.

One or more properties of the light output may be variable depending on a position of the set of optics, such as set of optics 262 contained within vehicle light 210 with respect to set of light sources 204. In one or more embodiments, an angle of light spread may be varied. Further, the angle of light spread of the set of light sources 204 may be the result of the projection of the light beams from the light sources 204 through the set of optics 262. Thus, controlling the positioning of and the spacing between the optics in the set of optics 262 and the set of light sources 204 affects the shape of the light output, such as the angle of light spread projected from the vehicle light 210. The angle of light spread is usually measured in degrees. The light spread can range from a relatively narrow spotlight to a floodlight with a wider angle of light spread. Spotlights are suitable to highlight a narrow area in front of a light source. Typically, spotlights are also used for highlighting areas at further distances or in lower visibility conditions. Floodlights provide a wider view and are suitable to include areas further to the side.

In another implementation, another example of changing the light output shape is varying the light projection from a circular and elliptical shape. This can be achieved by controlling the positioning of the optics in the vehicle light 210 (as shown, for example purposes only, in FIGS. 3 and 4). Other light output behavior can also be adjusted through any suitable design of the vehicle light components. For example, the vehicle light 210 can include different sets of LEDs that can be turned on to determine different shapes of light projection.

The positioning and spacing between the set of optics 262 and the light source 204 can be adjusted with an adjustability mechanism assembly 214, which may be coupled to the set of optics 262 and allows for movement of the set of optics 262 with respect to the set of light sources 204 and thus modifying the shape of the light output. For example, when an optic (e.g. optic 401) is moved in a linear direction towards or away from the set of light source 204, the angle of light spread is modified. The adjustability mechanism assembly 214 may comprise any suitable electromechanical components commonly known to one of ordinary skill in the art for moving the optics and hence varying the spacing between the optics and the light source 204. In one or more embodiments, adjustability mechanism 214 may include, without limitation, a yoke having a set of yoke lobes, a shaft, and a set of cams integrated with or attached to the shaft. Further, the shaft of adjustability mechanism may be rotatably coupled to a motor (e.g. motor 264) that is either coupled to or located within a housing of vehicle light 210. Further, the adjustability mechanism 214 may be coupled to the set of optics 262 disposed within vehicle light 210. In one or more embodiments, whereby the adjustability mechanism 214 includes a shaft as discussed above, as the shaft rotates, thereby causing the cams to rotate within an inner perimeter of the set of yoke lobes disposed on the yoke, the yoke may be caused to move linearly forwards and backwards.

The yoke may be coupled to the set of optics 262 using one or more coupling members (e.g. slide rails or any other fasteners known in the art). The linear movement forwards and backwards of the set of optics towards a set of light sources, such as set of light sources 204 also contained within the vehicle light 210 may result in either a spotlight or a floodlight. Thus, adjustability mechanism 214 may be configured to manipulate e the positioning and spacing of the optics 262 with respect to set of light sources 204 and accordingly to determine the angle of light spread and achieve either a floodlight or a narrow spotlight.

To manipulate a position of the shaft (not shown) in adjustability mechanism assembly 214, one or more motors, such as motor 264, may be included with vehicle light 210. Any suitable motor as known the art may be used for motor 264. In one implementation, motor 264 may be coupled to a housing of vehicle light 210. Alternatively, motor 264 may be integrated within a body of vehicle light 210.

In one implementation, a motor 264 in vehicle light 210 may be rotatably coupled to a shaft disposed within adjustability mechanism 214. A gear train mechanism having one or more gears may be rotatably coupled to motor 264, and a shaft of adjustability mechanism 214 may be rotatably coupled to motor 264. Thus, any rotational movement provided by motor 264 may be transmitted to a shaft in adjustability mechanism 214, which in turn, affects a position of a set of optics 262 that may be coupled to adjustability mechanism 214.

To control motor 264, a motor controller, such as motor controller 260 may be located within vehicle light 210. Motor controller 260 may be a controller used to control motor 264 and one or more functions of vehicle light 210. Motor controller 260 may include, without limitation, motor driver 212, transceiver 216, processor 206, and power regulator 202.

Controller 220 may, in one or more embodiments, be a device separate from light device 210. Controller 220 may provide the mechanism for sending an input or signal to vehicle light 210 in order to produce either a flood light or a spotlight. In one embodiment, controller 220 may transmit the data signals to motor controller 260. For instance, using data from the OBD system 240, the controller 220 may transmit commands to motor controller 260 to determine the movement needed for motor 264 and the adjustability mechanism assembly 214 for proper light spread adjustment.

The controller 220 may communicates with a transmitter/receiver module (transceiver) 216 in motor controller 260 to send/receive the control data. The transceiver 216 may be a wireless transceiver that communicates via wireless signaling with the controller 220, or may be connected via a data cable to the controller 220. In an embodiment, the transceiver may support both wired and wireless connectivity with the controller 220.

As previously discussed, motor controller 260 within vehicle light 210 may include processor 206. Processor 206 handles the control data from the transceiver 216 and forwards appropriate corresponding commands to motor 264. The processor 206 can be any chip or electronic board suitable for processing such data, in digital data. For example, the controller 220 may decrease the angle of light spread to achieve a spotlight during vehicle acceleration, or increase the angle of light spread during vehicle turns. The processor 206 receives from the controller 220 the control data to increase or decrease the light spread and sends appropriate commands to motor 264. A motor driver 212 may be included in vehicle light 210 to convert the commands into suitable input parameters for the motor 264, as known to one of ordinary skill in the art.

The control data from the controller 220 may also determine the lighting level or mode of the light source 204. For example, the controller 220 may be configured to increase light intensity or turn on more LEDs in a light bar in case of low visibility condition or during a vehicle turn. In this case, the processor 206 forwards appropriate corresponding commands to the light source 204. A light source driver 208 may be used to convert such commands into suitable input parameters for the light source 204.

Motor controller 260 may also include a power regulator 202 connected to the power source 230. The function of the power regulator 202 is to control the power distribution path to components of the vehicle light 210, such as the processor 206, the motor driver 212, the light source driver 208, the adjustability mechanism assembly 214 and the set of light sources 204. In addition, the power regulator may provide additional functions such as filtering power noise from the power source 230, providing safety measures against installation mistakes, regulating voltage levels for devices requiring different operating voltages and limiting the current draw.

Figure 3:
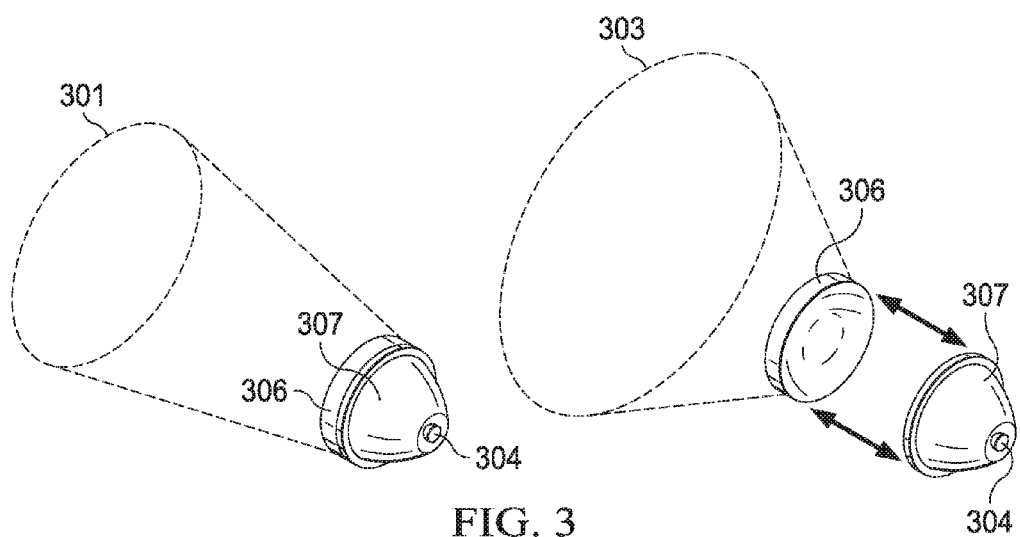
FIG. 3 is an illustration of adjustable light output or light spread of a vehicle light in accordance with an illustrative embodiment.

FIG. 3 shows a pictorial view of an adjustable light output or light spread for a vehicle light in accordance with an illustrative embodiment. Two possible light outputs 301 and 303 are shown for two configurations of a vehicle light. The vehicle light comprises a light source 304, a first optic component 306 positioned in front of the light source 304, and a second optic component 307 surrounding the light source 304 and positioned between the light source 304 and the first optic component 306. The first optic component 306 is a lens that spreads out the incoming light beam emitted from the light source 304. The second optic component 307 is a reflector that reflects and directs the light emitted from the light source 304 towards the first optic component 306. In this embodiment, the first optic 306 is moveable, via some suitable adjustability mechanism assembly, while the second optic 307 is stationary with the light source 304.

The first light output 301, which corresponds to a spotlight with a narrow light spread, can be achieved by positioning the first optic 306 in proximity or adjacent to the second optic 307. When the first optic 306 is moved further away from the second optic 307, a second light output 303 which corresponds to a floodlight with a broad light spread is achieved. In one implementation, adjustability mechanism 214 as discussed with respect to FIG. 2 may be used to position first optic 306 with respect to second optic 307.

Figure 4:
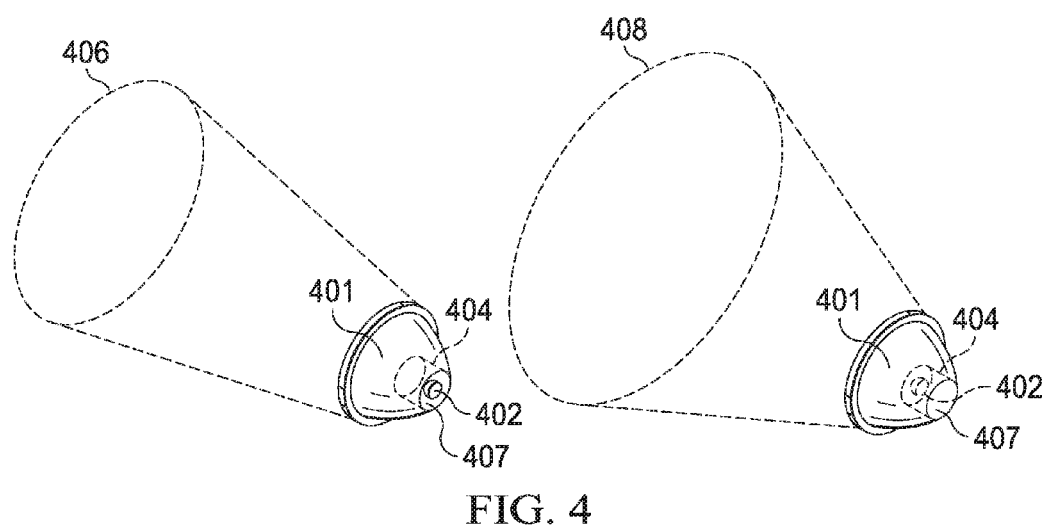
FIG. 4 is an illustration of adjustable light output or light spread of a vehicle light in accordance with an illustrative embodiment.

FIG. 4 shows a pictorial view of an adjustable spread light output or angle of light spread in accordance with an illustrative embodiment. FIG. 4 shows spotlight 406 and floodlight 408, which may be produced when an optic, such as optic 401 is extended away from or retracted towards a light source, such as LED 402. In one or more embodiments, optic 401 may be a total internal reflection (TIR) optic having an embedded plano-convex lens (not shown). In one implementation, the TIR optic may have a generally parabolic shape. The embedded plano-convex lens may be embedded within the generally parabolic shape, such that the front surface of the TIR optic tapers inwardly toward the embedded plano-convex lens. In addition, optic 401 may include a hollow channel 404 formed in a rear surface 407 of optic 401, whereby the hollow channel extends only partially through a thickness of optic 401.

In one or more embodiments, to produce a spotlight, such as spotlight 406, optic 401 may be extended away or moved away from LED 402. To produce a floodlight, such as floodlight 408, optic 401 may be retracted towards or moved proximate to LED 402.

An adjustability mechanism located in a vehicle light, such as adjustability mechanism 214 in vehicle light 210 discussed above with respect to FIG. 2, may be used to adjust a position of optic 401 with respect to LED 402. Accordingly, LED 402 and optic 401 may be contained within a vehicle light, such as vehicle light 210. By changing a position of optic 401 with respect to LED 402, an angle of light spread produced by LED 402 may be varied and adjusted to best suit the lighting needs of a user and/or driver of a vehicle, such as vehicle 150

Figure 5:
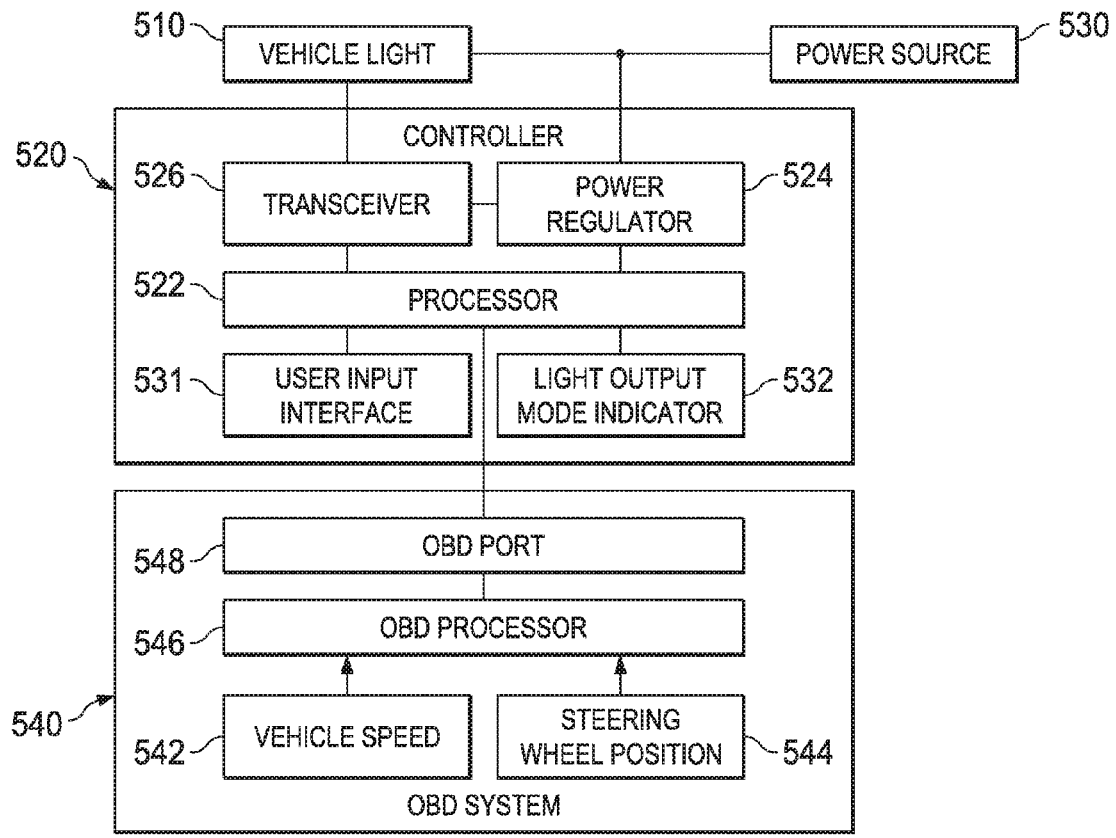
FIG. 5 is a block diagram of components of a controller for adjusting a vehicle light in accordance with an illustrative embodiment.

FIG. 5 shows a block diagram of components of a controller 520 for adjusting a vehicle light 510 in accordance with an illustrative embodiment. Controller 520 may be a controller in accordance with controller 120 in FIG. 1 and controller 220 in FIG. 2. Further vehicle light 510 may be a vehicle light in accordance with vehicle light 110 in FIG. 1 and vehicle light 210 in FIG. 2. Vehicle light 510 may be securely coupled to any surface of a vehicle, such as vehicle 150. Further, Power source 530 may be a power source in accordance with power sources 130 and 230 in FIGS. 1 and 2.

As described above, the connection between the controller 520 and the vehicle light 510 can be a wired or a wireless connection. The controller 520 is also connected to a OBD system 540 of the vehicle. OBD system 540 may be an OBD system in accordance with OBD system 140 in FIG. 1 and OBD system 240 in FIG. 2. Further, OBD system 540 may be located and operable within a vehicle, such as vehicle 150 as shown in FIG. 1. A power source 530 supplies power to the vehicle light 510, the controller 520, and the OBD system 540 via suitable wiring.

The OBD system 540 may include one or more sensors for measuring or collecting data related to vehicle movement or any data that can be used to determine a suitable light output mode for the vehicle light 510. The OBD system 540 can include a vehicle speed sensor or an accelerometer that measures the speed or acceleration of the vehicle. The OBD system 540 can also include a steering wheel position sensor that measures the angle of which the vehicle wheels are turning. Other sensors can also be used in the OBD system 540, such as tire pressure sensors, brake sensors, emission sensors, and/or vehicle performance sensors for determining various vehicle conditions. In an embodiment, the vehicle can include a global positioning system (GPS) for sensing the location of the vehicle. The GPS position data can be used by the controller 520 with the OBD data from the OBD system 540 to determine the light output mode for the vehicle light 510. A time clock can also be used by the controller 520 to determine the time of day.

The controller 520 can be connected to the vehicle built-in sensors via any OBD port 548 suitable for this purpose, for instance a standardized OBD-II port connection. The collected OBD data from the OBD system 542 is sent using the connection between in the OBD port 548 and the controller 520. The connection can be a wired connection using a data cable, or a wireless connection using a wireless transceiver that can be plugged into the OBD port 548, OBD port 548 may be a digital communications port in accordance with OBD port 148 in FIG. 1.

The OBD system 540 may also include an OBD processor 546 that receives information from the vehicle various systems including vehicle built-in or integrated sensors, and generates suitable OBD data according to this information. For instance, the OBD processor 546 can receive vehicle speed information 542 and/or steering wheel position information 544 from one or more sensors in the vehicle and generates corresponding OBD data. The OBD data is then sent via the OBD port 548 to the controller 520.

The controller 520 includes a processor 522 that receives the OBD data from the OBD port 548, and. processes the OBD data to determine a suitable light output mode, such as the angle of light spread of the vehicle light 510. The processor 522 then forwards to the vehicle light 510 the appropriate commands to implement the light output mode. The light output mode data is sent through a transceiver 526 to the vehicle light 510. The processor 522 can be any type of a processor suitable for processing such data, e.g., digital data. For example, the processor 522 can be a chip, a central processing unit (CPU), a computer board, or an electronic card.

The controller 520 may also include or be connected to a user input interface 531 that can be used by a driver or a user to select a light output mode for the vehicle light 510. The user input interface 531 is connected to the processor 522, which converts the user input selection into suitable commands for the vehicle light 510. The user input interface 531 can be part of the controller 522, or can be positioned anywhere accessible to the driver or user and connected to the controller 520. For example, the user input interface 531 (and controller 520 when user input interface 531 is part of controller 520) can be placed on the steering wheel, on the side console, or anywhere near the driver. The user input interface 531 can include any number of knobs or press buttons to select from multiple light output modes, such as a spotlight or floodlight mode, or to decrease and increase the angle of light spread. For example, the user can press one of two buttons to select a spotlight or floodlight mode, or can turn a knob to decrease or increase angle of light spread. In another embodiment, the user input interface 531 corresponds to a touch screen for selecting the light output mode.

In an embodiment, the user input interface 531 can be used to preset or adjust the settings of a light output mode. For instance, the user can determine the angle of light spread in degrees for the spotlight or floodlight mode. The user may also set the conditions for selecting a certain light output mode. For example, the user can set the speed at which the light output mode can switch from floodlight to spotlight, or can select which light output mode to switch to during a vehicle turn.

The user input interface 531 may also allow the user to switch between a manual operation and autonomous operation to select the light output mode. Manual operation allows the user to select the light output mode using the knobs, press buttons, or touch screen. In autonomous operation, the processor 522 selects the light output mode of vehicle light 510 based on OBD data, as described above.

In FIG. 5, including both the OBD system 540 and the user input interface 531 in the controller system allows for both manual operation (i.e. controlling vehicle light 510 by user input that is provided to controller 520 directly from a user) and also by autonomous operation (i.e. controlling vehicle light 510 by using OBD data obtained from an OBD system in a vehicle, such as OBD system 540) in adjusting the light output of the vehicle light 510. In another embodiment, the controller system provides autonomous operation mode according to OBD data and without user manual operation. In this case, a user input interface 531 may not be needed.

The controller 522 may also include or be connected to a light output mode indicator 532 that indicates in some manner the current light output mode of the vehicle light 510. The light output mode indicator 532 can be part of the controller 522, or can be positioned anywhere accessible to the driver or user and connected to the controller 520. For example, the light output mode indicator 532 can be part of the vehicle dashboard or front panel. The light output mode indicator 532 can display the angle of light spread, e.g., in degrees, in the form of a gauge, a LED screen, or other display. In an exemplary embodiment, without limitation thereto, the light output mode indicator 532 and the user input interface 531 may be combined into a device possibly comprising a touch screen. The user or driver may be made aware of the current light output mode so that the user or drive can then decide whether to keep such mode or manually adjust the light spread.

The controller 522 also includes a power regulator 524 connected to the power source 530. The power regulator 524 regulates and controls the power distribution path to components of the controller 522, such as the processor 522, the transceivers 526 and 528, the user input interface 531, and the light output mode indicator 532.

At least some of the components of the controller 522 may be combined in a single box. The controller box may be located or placed in any suitable location in the vehicle. In an embodiment, at least some of the components of the controller 522, such the user input interface 531 or the light output mode indicator 532 may be implemented on a smart communications device, such as a smartphone or a computer tablet. The controller box may also correspond to a smart communications device.

Figure 6:
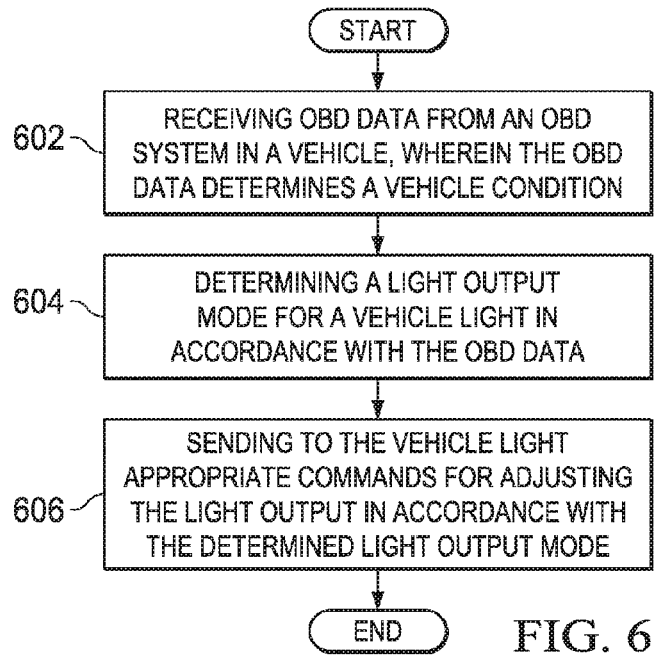
FIG. 6 is a flowchart illustrating a process for controlling a vehicle light in accordance with an illustrative embodiment.

FIG. 6 is a flowchart illustrating a process for controlling a vehicle light in accordance with an illustrative embodiment. The process described in FIG. 6 may utilize one or more components of the controller system shown in FIGS. 1-7 described above. For example, without limitation, the process may utilize one or more components of controller 520, OBD system 540, and vehicle light device 510, 210, and 110.

The process may correspond to an autonomous operation mode to adjust the light output of a vehicle light, for example without the need of input from a driver. The process may begin by receiving OBD data from an OBD system in a vehicle, wherein the OBD data determines a vehicle condition (step 602). One or more sensors can be part of the OBD system, such as vehicle built-in or integrated sensors. The OBD data are received by a controller of the vehicle light, such as the controller 520. For instance, the OBD data is received via a data cable connecting the controller to an OBD port of the OBD system. Alternatively, the processor receives the OBD data via a wireless connection to the OBD port.

The OBD data can be any information collected by the OBD system, possibly from one or more sensors of the vehicle connected to the OBD system. The OBD data is used for determining a vehicle condition. For example, the OBD data includes vehicle speed data collected by some vehicle sensor that may be integrated within the vehicle. The OBD data can also include the steering wheel position to detect whether a vehicle is moving in a straight direction or is turning. In addition to vehicle movement related sensors, other sensor data can also be considered, such as tire pressure or vehicle brake sensors.

Next, the process may include determining a light output mode for the vehicle light in accordance with the OBD data (step 604). For example, when the controller or processor determines that the vehicle speed has increased or exceeded a preset threshold speed, a spotlight mode with narrow angle of light spread is chosen. In another example, the sensor data indicates a turn of the wheel. In this case, a floodlight mode with a wide angle of light spread is chosen. The controller may also determine according to OBD data from vehicle brake sensors whether a vehicle is slowing down, and selects accordingly a proper light output mode, such as a wide angle light spread mode. The degree of the angle of light spread for each chosen light mode can be preset.

Subsequently, the process may include sending to the vehicle light appropriate commands for adjusting the light output in accordance with the determined light output mode (step 606). For instance, the controller and/or processor may determine the appropriate commands for adjusting the light spread or light shape. The commands can include commands to the adjustability mechanism assembly at the vehicle light to adjust the spacing between the optics and the light source. The commands can also determine the light intensity at the vehicle light, for example the number of LEDs to turn on at the vehicle light. The process may terminate thereafter or may continuously be repeated to adjust the light output as vehicle or environment conditions change.

Many desirable benefits are provided by adjusting the light output a vehicle light or light fixture using a controller system as described in one or more embodiments herein. A vehicle light device, as described above, may be used to produce a floodlight or a spotlight, and to further illuminate an area of road or highway that is being driven upon. Notably, a vehicle light device as described herein may be useful for any type of user. For example purposes, without limitation, police, fire, emergency personnel may find such a light device particularly useful for providing either a wider-angle floodlight to better illuminate a broad area or to shine a more narrow focused spotlight at a scene of interest. In addition, off-road vehicle drivers and operators may find such a light device particularly useful. Off-road vehicles frequently venture onto roads that are uneven and unpaved at relatively high speeds. Being able to switch between a floodlight and a spotlight produced by a same light device may enable such off-road vehicles to manage such uneven terrain at high speeds much better than before. Nevertheless, as previously stated, one or more embodiments of a controller system for adjusting the light output of a vehicle light as described in the present description may have any number of applications and benefit a variety of users, including the non-commercial, average driver of a non-commercial vehicle.

The flowchart and block diagrams in the figures illustrate the architecture, functionality, and operation of possible implementations of the controller and light system components according to various embodiments. The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations may be made to these embodiments without departing from the broader spirit and scope of the invention as set forth in the claims. It is also understood that other embodiments may be utilized and that logical structural, mechanical, chemical, and/or electrical changes may be made without departing from the spirit or scope of the invention.

What is claimed is:

1. An apparatus for controlling a vehicle light with adjustable light output, the apparatus comprising:
   a processor configured to receive on-board diagnostics (OBD) data and determine a light output mode for the vehicle light in accordance with the OBD data, wherein the OBD data indicates a vehicle condition; and
   a transceiver coupled to the processor and configured to signal the light output mode to the vehicle light, wherein the apparatus is coupled to an OBD system in a vehicle comprising one or more sensors configured to detect the OBD data, and wherein the OBD data is configured to be sent to the processor.

2. The apparatus of claim 1 further comprising a second transceiver for receiving the OBD data from the OBD system.

3. The apparatus of claim 1, wherein the OBD system indicates the speed of the vehicle.

4. The apparatus of claim 1, wherein the OBD system indicates a steering wheel position of the vehicle.

5. The apparatus of claim 1, wherein the OBD system comprises a digital communications port for connecting the OBD system to the processor.

6. The apparatus of claim 1, wherein the light output mode is one of a spotlight mode and a floodlight mode.

7. The apparatus of claim 1, wherein the processor is configured to determine an angle of light spread of the light output in accordance with the OBD data.

8. The apparatus of claim 1, wherein the vehicle light is an auxiliary light fixture attachable to or mountable on a vehicle.

9. The apparatus of claim 1, wherein the vehicle condition corresponds to vehicle speed or vehicle turn.

10. The apparatus of claim 1, wherein the apparatus further comprises or is coupled to a user input interface, wherein the processor is further configured to receive from the user input interface a user selection related to the vehicle light or the light output mode.

11. The apparatus of claim 1, wherein the apparatus further comprises or is coupled to a light output mode indicator configured to display the light output mode of the vehicle light.

12. A method of controlling a vehicle light with adjustable light mode, comprising:
  receiving on-board diagnostics (OBD) data from an OBD system in a vehicle, wherein the OBD data determines a vehicle condition;
  determining, using a processor, a light output mode in accordance with the OBD data; and
  sending to the vehicle light appropriate commands for adjusting the light output in accordance with the determined light output mode, wherein determining the light output mode in accordance with the OBD data further comprises decreasing an angle of light spread upon detecting a vehicle speed exceeding a preset threshold, and increasing the angle of light spread upon detecting a vehicle turn.

13. The method of claim 12, wherein the OBD data further comprises data detected by the OBD system for determining a speed of the vehicle.

14. The method of claim 12, wherein the OBD data further comprises data detected by the OBD system for determining velocity steering wheel position of the vehicle.

15. The method of claim 12, wherein determining the light output mode in accordance with the OBD data further comprises selecting a spotlight mode upon detecting the vehicle speed exceeding a preset threshold, and selecting a floodlight mode upon detecting the vehicle turn.

16. The method of claim 12, further comprising receiving the OBD data in the vehicle and sending the commands to the vehicle light using a wireless signal connection, a data cable, or both.

17. An apparatus for controlling a vehicle light with adjustable light output, the apparatus comprising:
  a processor configured to receive on-board diagnostics (OBD) data from an OBD system in a vehicle and determine an angle of light spread for the vehicle light in accordance with the OBD data; and
  a transceiver coupled to the processor and configured to signal the determined angle of light spread to the vehicle light.

18. The apparatus of claim 17, wherein the OBD system is an OBD-II system, wherein the OBD-II system further comprises a digital communications port for providing the OBD data to the processor.

* * * * *